UNITED STATES PATENT OFFICE.

EHREGOTT SCHRÖDER, OF BERLIN, GERMANY.

MANUFACTURE OF METAL FOIL.

SPECIFICATION forming part of Letters Patent No. 509,951, dated December 5, 1893.

Application filed January 11, 1887. Serial No. 224,040. (Specimens.)

*To all whom it may concern:*

Be it known that I, EHREGOTT SCHRÖDER, a subject of the King of Prussia, German Emperor, residing at the city of Berlin, in the Kingdom of Prussia, German Empire, have invented a certain new and useful Improved Process for the Production of Metal Paper, Metal Cardboard, and Similar Material; and I do hereby declare that the following is a full, clear, and exact description of the invention, which will enable others skilled in the art to which it appertains to make and use the same.

My invention has reference to a process for the production of a metal foil and it consists in coating smooth bodies which are conductors of electricity with a thin film of an organic substance, precipitating upon said film a precipitate of the metal of which the foil is to consist and withdrawing from the said bodies the foil thus formed.

It consists further in applying a layer of paper to the foil thus formed and stripping the paper and foil together from the plate.

In carrying out my invention, I cover over smooth plates or bodies having a smooth surface with a coat of varnish, or the like, and pass the same into a solution of the metal from which it is desired to form foil. I then pass an electric current through the solution whereupon the metal becomes precipitated on the said plates or bodies in the form of an extremely thin coating. I strip this coating from the plate and thus obtain an extremely thin metal foil.

When it is desired for purposes of economy as in the case of the precious metals to make the foil so thin that its withdrawal from the plates or bodies on which it has been precipitated is rendered difficult, I affix paper or any suitable vegetable material upon the foil by means of glue or other attaching substance and withdraw such material together with the foil from the plates or bodies.

I am well aware that thin foil has previously been manufactured but this has been effected in a purely mechanical way and can neither be made so thin nor so simply or economically as by the process of this invention.

My invention rests upon the discovery that adherence of the foil to the smooth plate or other body upon which it is precipitated is prevented by the employment of an organic substance which will leave an extremely thin coating upon the plate, this coating in no wise materially affecting the conductivity of the electrolyte with respect to the plate itself. A suitable varnish for the purpose is what is known to the German trade as "spiritusfirniss" which is a solution of collodion in ether and alcohol,—preferably an ether solution of three to four per cent. The solution is applied to the plate in any suitable manner, as by immersion, and on drying the ether evaporates leaving the collodion in the form of an extremely thin film upon the plate.

Having thus described my invention, what I claim is—

1. The process of making metal foil of extreme thinness by coating smooth bodies which are conductors of electricity with a thin film of an organic substance and then precipitating upon said film a precipitate of the metal of which the foil is to consist and withdrawing from the said bodies the foil thus formed, substantially as described.

2. The process of making metal foil of extreme thinness by coating smooth bodies which are conductors of electricity with a thin film of an organic substance and then precipitating upon said film a precipitate of the metal of which the foil is to consist and withdrawing from the said bodies the foil thus formed by applying to said foil a layer of paper and stripping the paper and foil together from the plate; substantially as described.

In testimony whereof I sign this specification in the presence of two subscribing witnesses.

EHREGOTT SCHRÖDER.

Witnesses:
EMIL COPITENIE,
B. ROI.